United States Patent [19]
Okino et al.

[11] Patent Number: 5,835,132
[45] Date of Patent: Nov. 10, 1998

[54] STEREO-GRAPHIC SYSTEM

[75] Inventors: Toshiyuki Okino, Kadoma; Toshiya Iinuma, Moriguchi; Hideyuki Kanayama, Kadoma; Haruhiko Murata, Takatsuki, all of Japan

[73] Assignee: Sanyo Electric Co., Ltd., Osaka, Japan

[21] Appl. No.: 268,011

[22] Filed: Jun. 29, 1994

[51] Int. Cl.$^6$ .......................... H04N 13/00; H04N 13/02; H04N 13/04
[52] U.S. Cl. .................................. 348/42; 348/43; 348/55
[58] Field of Search .................................. 348/42, 43, 51, 348/49, 54, 55, 56, 57; H04N 13/00, 13/02, 13/04

[56] References Cited

U.S. PATENT DOCUMENTS

| | | | |
|---|---|---|---|
| 3,674,921 | 7/1972 | Goldsmith | 348/43 |
| 3,818,125 | 6/1974 | Butterfield | 348/42 |
| 4,523,226 | 6/1985 | Lipton | 348/42 |
| 4,743,965 | 5/1988 | Yamada | 348/43 |
| 5,126,878 | 6/1992 | Trumbull | 348/54 |
| 5,193,000 | 3/1993 | Lipton | 348/51 |
| 5,341,168 | 8/1994 | Hernandez | 348/42 |

FOREIGN PATENT DOCUMENTS 04078238  12/1992  Japan .

*Primary Examiner*—Howard W. Britton
*Attorney, Agent, or Firm*—Loeb & Loeb LLP

[57] ABSTRACT

A stereo-graphic system has an optical apparatus, an imaging apparatus and a recording and reproducing apparatus. The optical apparatus has a first optical device for providing right eye picture information which has a first direction. The optical apparatus also has a second optical device for providing left eye picture information which has a second direction which is coincident with the first direction. The right eye picture information and the left eye picture information are compressed along the first direction. The imaging apparatus has an imaging device which has an imaging area for providing an output image signal. The imaging area has a right region and a left region. A focusing device in the imaging apparatus focuses the right eye picture information and the left eye picture information on the right region and the left region respectively. The recording and reproducing apparatus has a recording medium, a recording device and a reproducing device. The recording device records the output image signal from the imaging device on the recording medium. Further, the reproducing device reproduces a reproducing signal from the recording medium. The reproducing signal is provided to a converter which expands the compressed right eye picture information and the compressed left eye picture information.

20 Claims, 7 Drawing Sheets

STEREO-GRAPHIC SYSTEM

FIELD OF THE INVENTION

The present invention relates to a stereo-graphic system. More particularly, the present invention relates to a stereo-graphic system having an imaging apparatus in which compressed right and left images are formed on one imaging device.

BACKGROUND OF THE INVENTION

Typically, two cameras are used to obtain a stereo-graphic image. The two cameras are spaced at a predetermined distance from each other along a horizontal direction, which direction is the same as for human right and left eyes, so that two pictures provided from the two cameras contain parallax information through which observers can see the stereo-graphic image.

It is, however, relatively expensive to use two cameras. Therefore, a stereo-graphic apparatus having only one imaging device is proposed. Japanese patent publication HEI 04-78238 published Dec. 10, 1982 describes a stereo-graphic apparatus having only one imaging device. For example, as shown in FIG. 7, light from an object 14 is reflected by mirrors 15, 16, 17 and 18 and focused by a lens 19 on an imaging device, such as, for example, a charge coupled device (CCD). An image for the right eye and an image for the left eye are reflected by the set of mirrors 17 and 18, and the set of mirrors 15 and 16 respectively. The two images are focused on different regions 20a and 20b of the imaging device 12. The two regions 20a and 20b, which are respectively associated with the image for right and the image for left, are located along a vertical direction 20. The vertical direction is perpendicular to the horizontal direction along which a human's eyes are located.

The imaging device 12 has an imaging area 13 which is scanned to produce electric signals representative of the right and left images, as shown in FIG. 8. The left eye's region 20b is first scanned, and then the right eye's region 20a is scanned. At each region, the ratio between the height and the width is 2 (height) to 3 (width). Therefore, the ratio of the whole imaging area 13 is almost 4 (height) to 3 (width).

In contrast, a typical consumer video camera uses an imaging device having an imaging area with its proportion being 3 (height) to 4 (width). Consequently, it is impossible to use the method disclosed in the aforementioned Japanese Patent publication in a consumer video camera.

Further, the apparatus, as shown in FIG. 7, needs relatively complicated mirror adjustment, because the adjustment of the right eye's image and the left eye's image requires light paths of differing heights, i.e., twisted light paths. Further, in the apparatus disclosed in the Japanese Patent publication, the field of view is narrow when the same object lens is used. This is because each of the right and the left images is formed on only half the usual imaging area.

SUMMARY OF THE INVENTION

An object of embodiments of the present invention is to provide a stereo-graphic system having a single imaging device with relatively a simple structure.

Another object of embodiments of the present invention is to provide a stereo-graphic system for use with an ordinary consumer video camera apparatus.

Still another object of embodiments of the present invention is to provide a stereo-graphic system with a wide field view.

These and other object of the present invention are achieved by a stereo-graphic system having an optical apparatus, an imaging apparatus and a recording and reproducing apparatus. The optical apparatus has a first optical device for providing right eye picture information which has a first direction. The optical apparatus also has a second optical device for providing left eye picture information which has a second direction which is coincident with the first direction. The right eye picture information and the left eye picture information are compressed along the first direction. The imaging apparatus has an imaging device which has an imaging area for providing an output image signal. The imaging area has a right region and a left region. A focusing device in the imaging apparatus focuses the right eye picture information and the left eye picture information on the right region and the left region respectively.

The recording and reproducing apparatus has a recording medium, a recording device and a reproducing device. The recording device records the output image signal from the imaging device on the recording medium. Further, the reproducing device reproduces a reproducing signal from the recording medium. The reproducing signal is provided to a converter which expands the right eye picture information and the left eye picture information which have been compressed.

DETAILED DESCRIPTION OF THE PREFERRED EMBODIMENTS

Figure 1:
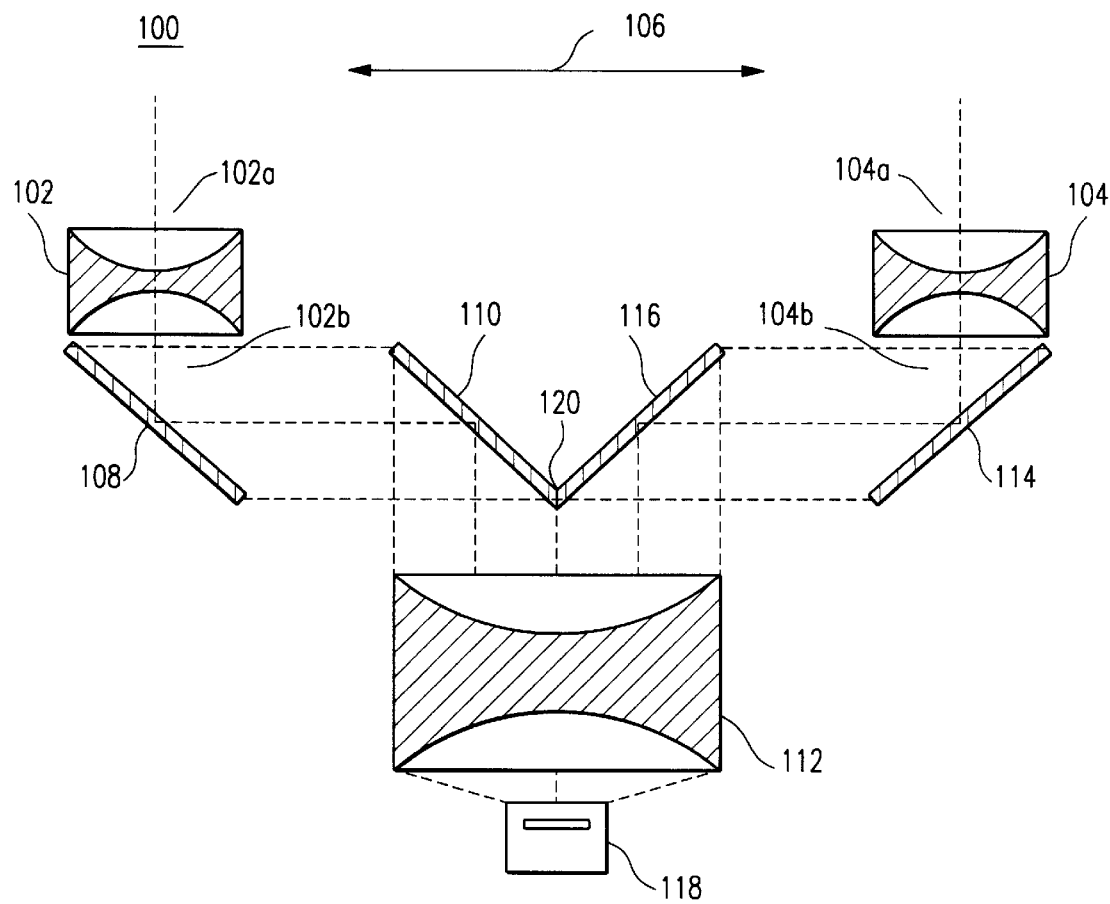
FIG. 1 is an explanatory view showing an optical system of one embodiment of the present invention.

FIG. 1 shows an optical system 100 of a first embodiment of the present invention. A first anamorphic lens 102 and a second anamorphic lens 104 are disposed along a direction 106. Each anamorphic lens 102, 104 has an object side 102a (104a) and an output side 102b (104b). The object side 102a (104a) is facing the object (not shown in FIG. 1) to be imaged. The output side 102b (104b) of the anamorphic lens provides an output image. The direction 106 in parallel o the direction along which the human eyes are disposed, namely the horizontal direction. An anamorphic lens provides an optical image which is compressed at a predetermined ratio along one direction. Hereinafter, the direction along which an image is compressed, is called a compress direction. In this embodiment, the ratio of compression is two to one. That is, each picture(image) from these anamorphic lenses is compressed by half in the compress direction. Further, the compress direction of the first and the second anamorphic lenses 102 and 104 is coincident with the direction 106. It is relatively easy to dispose the first and the second anamorphic lenses in a manner such that their compress directions coincide with each other. The first anamorphic lens 102 provides left eye picture information and the second anamorphic lens 104 provides right eye picture information.

The left eye picture information from the first anamorphic lens 102 is reflected by a first and second mirror 108 and 110, and is directed into an imaging lens 112 which consists of a plurality of lenses. The first and the second mirror 108 and 110 are disposed at the output side of the first anamorphic lens 102. Further, the center of each of the first and the second mirrors 108 and 110 is on one line along the direction 106. Each of the first and the second mirrors 108 and 110 is, illustratively, a plane mirror.

The right eye picture information from the second anamorphic lens 104 is reflected by a third and forth mirror 114 and 116, respectively, and is directed into the imaging lens 112. The third and forth mirrors 114 and 116 are disposed at the output side of the second anamorphic lens 104. Further, the center of each of the third and the forth mirrors 114 and 116 is also on one line, along the direction 106. Each of the third and the forth mirrors 114 and 116 is, illustratively, a plane mirror.

The second mirror 110 and the forth mirror 116 are disposed in front of the imaging lens 112. In one embodiment, the second mirror 110 and the forth mirror 116 are joined at a boundary line 120 which is aligned with the center of the imaging lens 112. The imaging lens 112 combines the images on the second mirror 110 and the forth mirror 116, and provides a combined image on a single CCD 118.

As described above, each of the first anamorphic lens 102 and the second anamorphic lens 104 respectively provides a half compressed image along the compress direction. Images from the first anamorphic lens 102 and the second anamorphic lens 104 are combined by the second mirror 110 and the forth mirror 116. Next, a combined image is imaged on the CCD 118 through the imaging lens 112.

Figure 2A:
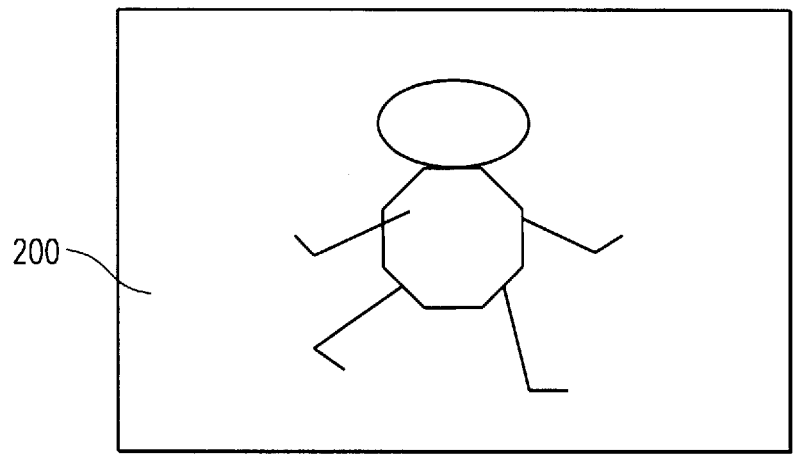
FIGS. 2(a) and 2(b) are explanatory views showing the operation of one embodiment of the present invention.
Figure 2B:
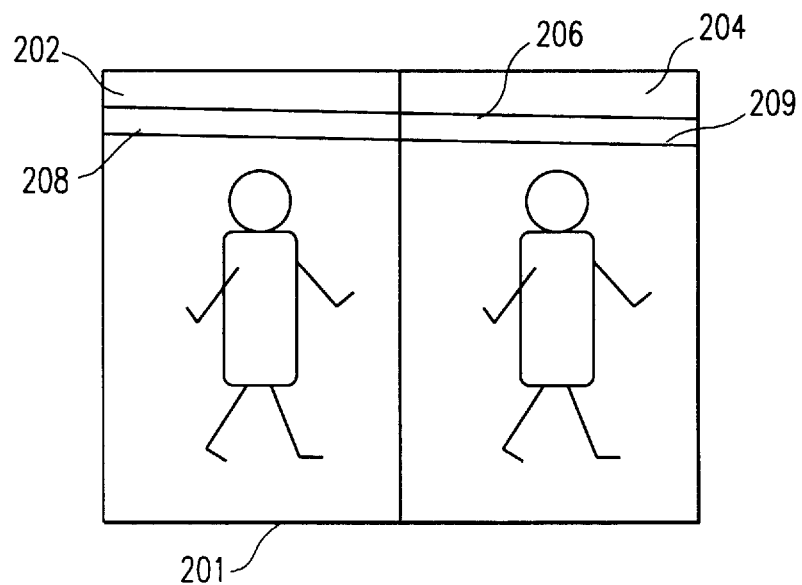

FIG. 2(*a*) shows an uncompressed image of an object 200. FIG. 2(*b*) shows the compressed image as obtained at the CCD 118. The left eye information 202 and the right information 204 are combined and imaged on the CCD 118. In other words, the CCD has one imaging area 201 and the imaging area 201 divided into two equal regions, namely, a left region 202 and a right region 204. The left eye picture information is focused on the left region 202. The right eye picture information is focused on the right region 204. The optical system shown in FIG. 1 has a very simple optical structure, with no twisted light path. Therefore, it is relatively easy to manufacture this embodiment.

Typically, a video signal, such as, for example, an NTSC standard video signal, consists of a plurality of lines. One of the lines corresponds to a full line, such as, for example, 206 in FIG. 2(*b*). The left eye picture information consists of a plurality of half lines, such as, for example, 208 in FIG. 2(*b*). The right eye picture information also consists of a plurality of half lines, such as, for example, 209 in FIG. 2(*b*).

Figure 3:
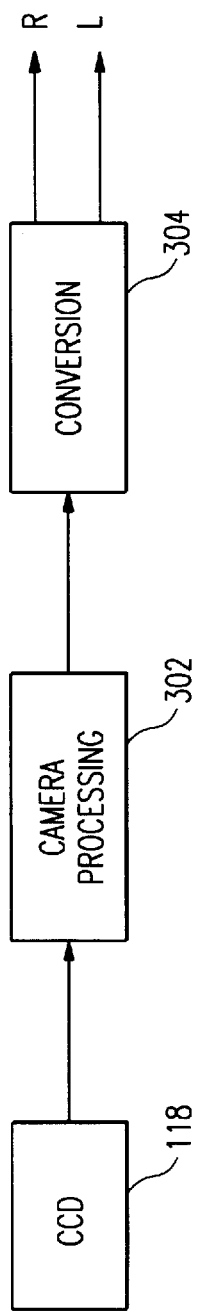
FIG. 3 is a block diagram of one embodiment of the present invention.

FIG. 3 shows a signal processing circuit of the first embodiment. The CCD 118 provides an output signal to a camera processing circuit 302. The camera processing circuit 302 processes the output signal from the CCD 118 and provides a video output signal. The video signal provided from the camera processing circuit 302 is substantially the same as an NTSC standard video signal, but is different as it contains two images, namely, the left eye picture information and the right eye picture information. A conversion circuit 304 receives the video output signal from the camera processing circuit 302. The conversion circuit 304 converts the compressed images into usual images by expanding (by a factor of two) the compressed images. The conversion circuit 304 provides a left channel output signal (L) and a right channel output signal (R) simultaneously. Further, the left channel output signal (L) and the right channel output signal (R) are provided to a stereo-graphic monitor (not shown in FIG. 3), to provide a stereo-graphic image. The left and right regions, which are respectively associated with the left and the right eye picture information, are half the usual imaging region. However, as each of the left and the right eye picture information is compressed and focused on the CCD 118, each of the obtained images has the same view angle as that of the usual camera with the standard imaging lens and the standard CCD.

Figure 4:
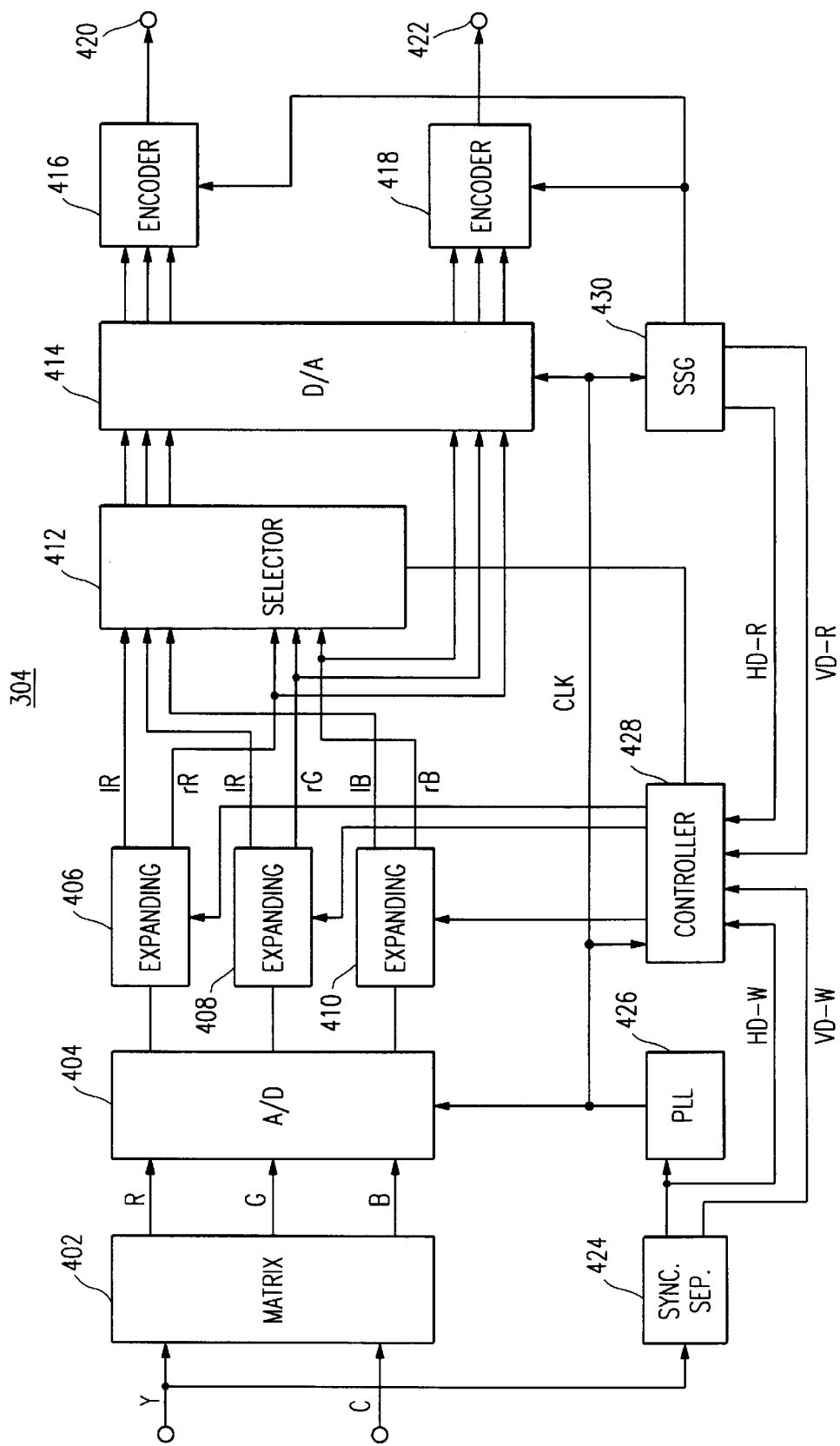
FIG. 4 is a block diagram of a converter circuit in one embodiment of the present invention.

Next, referring to FIG. 4, a detailed explanation of the conversion circuit 304 will be made. The video output signal from the camera processing circuit 302 is a composite video signal which contains a luminance signal (including a synchronous signal) and a modulated color signal. Further, the synchronous signal contains a vertical synchronous signal and a horizontal synchronous signal. First, the luminance signal (Y) and the modulated color signal (C) are derived from the video output signal by a separation circuit (not shown in FIG. 4). Further, the luminance and modulated color signal are fed to a matrix circuit 402. The matrix circuit 402 provides three color signals, namely red (R), green (G) and blue (B) signal by decoding the luminance and color signals.

The three color signals (R), (G) and (B) are respectively converted into digital color signals by an analog to digital (A/D) converter 404. The resulting three digital color signals are respectively fed to associated line expanding circuits 406, 408 and 410. Each line expanding circuit includes a digital line memory which is capable of storing, at least, a video signal of several line periods. Further, each line expanding circuit 406, 408 and 410 contains a delay circuit so that each line expanding circuit provides left eye picture information and right eye picture information simultaneously.

The operation of the line expanding circuits 406, 408 and 410 takes place, for example, as follows. The digital color signal, for example, the R signal, is a series of sampled digital values of the color signal at a predetermined sampling period. The digital memory of the line expanding circuits has memory cells. Each digital value is stored in the memory cells in a predetermined order. The stored digital value is read-out, almost simultaneously as stored, in the same order as stored. Further, each digital value in the memory cell is read-out twice. As a result, each of the left and the right eye picture information is expanded twofold. In other words, a half line 208 in FIG. 2 is expanded to one full length line 206 in FIG. 2.

The read-out operation from the digital memory takes longer than the storing operation in the expanding operation. Therefore, it is necessary that the digital memory have enough memory cells to store the digital signal from the A/D converter without failing to store.

As a result of the expanding operation, a left-R signal (lR), a left-G signal (lG), a left-B signal (lB)(together the left signals), a right-R signal (rR), a right-G signal (rG), a right-B signal (rB)(together the right signals), which are all expanded twofold, are provided from the three line expanding circuits 406, 408 and 410. A selector 412 receives these signals and selects one of the right and left signals according to the output mode of the conversion circuit 304. Namely, the selector 412 provides three right color signals lR, lG and lB in an ordinary mode. On the other hand, the selector 412 provides alternately right color signals and left color signals in a time-division mode. The selector 412 provides selected signals to a digital to analog (D/A) converter 414.

The left color signals are directly provided to the D/A converter 414. The D/A converter 414 provides analog left and right signals to a right encoder 416 and a left encoder 418, respectively. Each encoder 416 and 418 respectively provides a right composite signal at a terminal 420 and a left composite signal at a terminal 422. Each composite signal includes a luminance signal, a color signal and a synchronous (sync) signal.

In the time-division mode, the right composite signal and the left composite signal are alternatively provided from the right encoder 416 for a predetermined period, such as, for example, one field period. In the NTSC signal, one field period is 1/60 second, and one picture is produced in one field period.

Numeral 424 denotes a synchronous signal separator which separates a write horizontal synchronous (HD-W) signal and a write vertical synchronous (VD-W) signal from the luminance signal Y. The HD-W signal is provided to a phase look loop (PLL) circuit 426 which provides a clock signal that is synchronous with the HD signal. The clock signal from the PLL circuit 426 is provided to the A/D converter 404 and the D/A converter 414 to control their operation.

The clock signal is also provided to a timing controller 428 and a synchronous signal generator (SSG) 430. The SSG 430 provides a read-out HD signal (HD-R) and a read-out VD signal (VD-R) based on the clock signal.

The HD-W signal and the VD-W signal are provided to the timing controller 428. The HD-R signal and the VD-R signal are also provided to the timing controller 428. The timing controller 428 controls the operation of the line expanding circuits 406–410 based on the clock signal, the HD-W signal, the VD-W signal, the HD-R signal and the VD-R signal. The writing operation of the line expanding circuits 406–410 is controlled according to the HD-W signal and the VD-W signal. Further, the read-out operation of the line expanding circuit 406–410 is controlled according to the VD-R and HD-R signals. The timing controller also controls the operation of the selector 412. It is necessary that the selector 412 operate synchronously with the HD-R signal and the VD-R signal, because the output of the expanded signal from the line expanding circuit 406–410 is synchronous with the HD-R signal and the VD-R signal.

As described above, the right composite signal is provided on a terminal 420 and the left composite signal is provided on a terminal 422 in the ordinary mode. In that case, these signal are provided to a stereo-graphic monitor (not shown in FIG. 4). In the time-division mode, a time-divisional signal is on the terminal 420. The time-divisional signal contains the right composite signal and the left composite signal. The time-divisional signal is provided to another type of stereo-graphic monitor which is viewed with a pair of stereo-graphic glasses. The stereo-graphic glasses have two optical shutters associated with the right eye and the left eye of a person, respectively. The two optical shutters alternatively open and close in synchronism with pictures from the monitor so that an observer with the stereo-graphic glasses can see pictures for the right eye with only the right eye, and pictures for the left eye with only the left eye. Therefore, the observer with the stereo-graphic glasses can see the stereo-graphic view.

Figure 5:
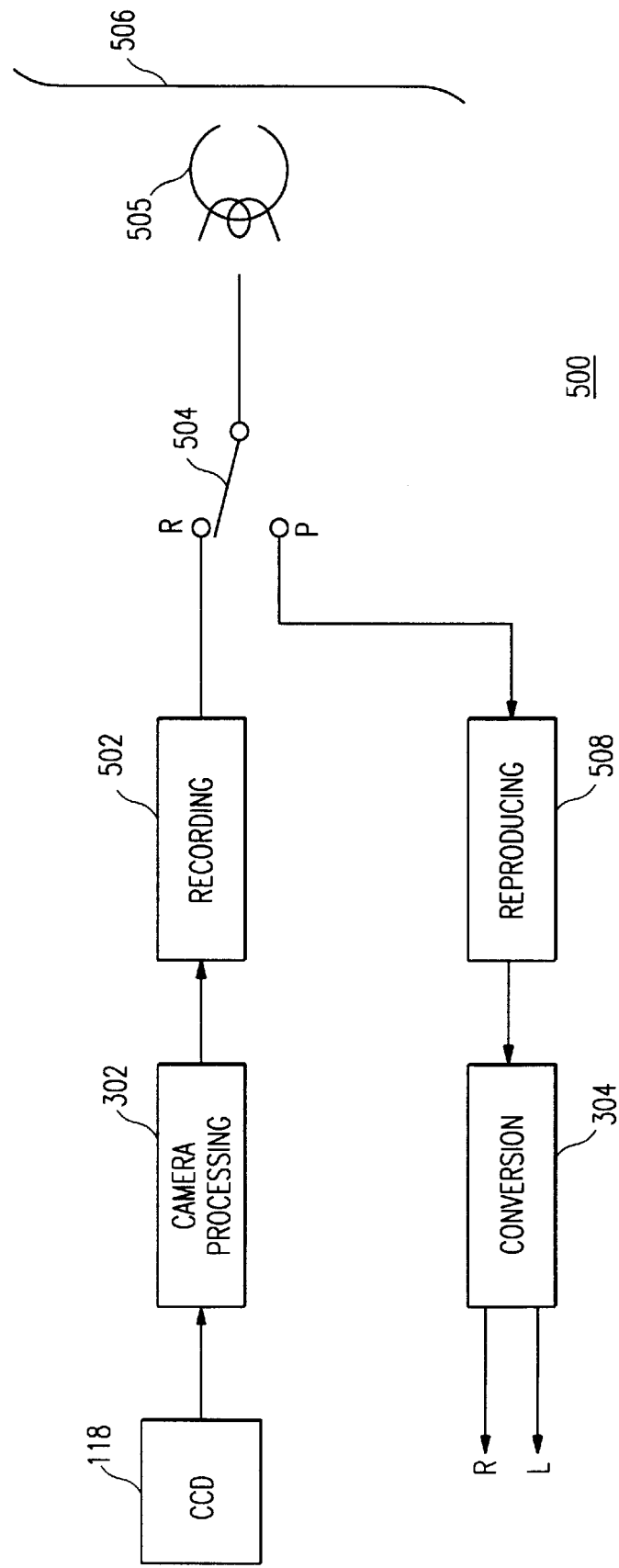
FIG. 5 is a block diagram of another embodiment of the present invention.

FIG. 5 shows the block diagram of a second embodiment. The second embodiment is a stereo-graphic camcorder. A CCD 118 provides an output signal to the camera processing circuit 302. A recording circuit 502 receives the video output signal from the camera processing circuit 302 and provides a record video signal to a switch 504. The record video signal is a signal which is preferably recorded on a video tape 506. The camera processing circuit 302 and the recording circuit 502 are the same as those used in an usual camcoder. The record video signal, however, is different from that of an usual camcorder. The record video signal in the embodiment contains the right eye picture information and the left eye picture information, in one channel signal. In the recording mode, the switch 504 selects a terminal R so that the record video signal is provided to a magnetic head 505. The record video signal is recorded on the tape 506 by the magnetic head 505.

In the reproducing mode, the magnetic head 505 reproduces a signal from the video tape 506 and provides a reproducing video signal to a reproducing circuit 508. The reproducing video signal also includes the right eye picture information and the left eye picture information in one channel. The reproducing circuit 508 converts the reproducing video signal into a signal which is processed by the conversion circuit 304. The conversion circuit 304 processes its input signal to provide the right composite signal and the left composite signal, as described above.

The configuration in FIG. 5 is substantially the same as that of the usual camcorder. However, the conversion circuit 304 is not contained in the usual camcorder.

Figure 6:
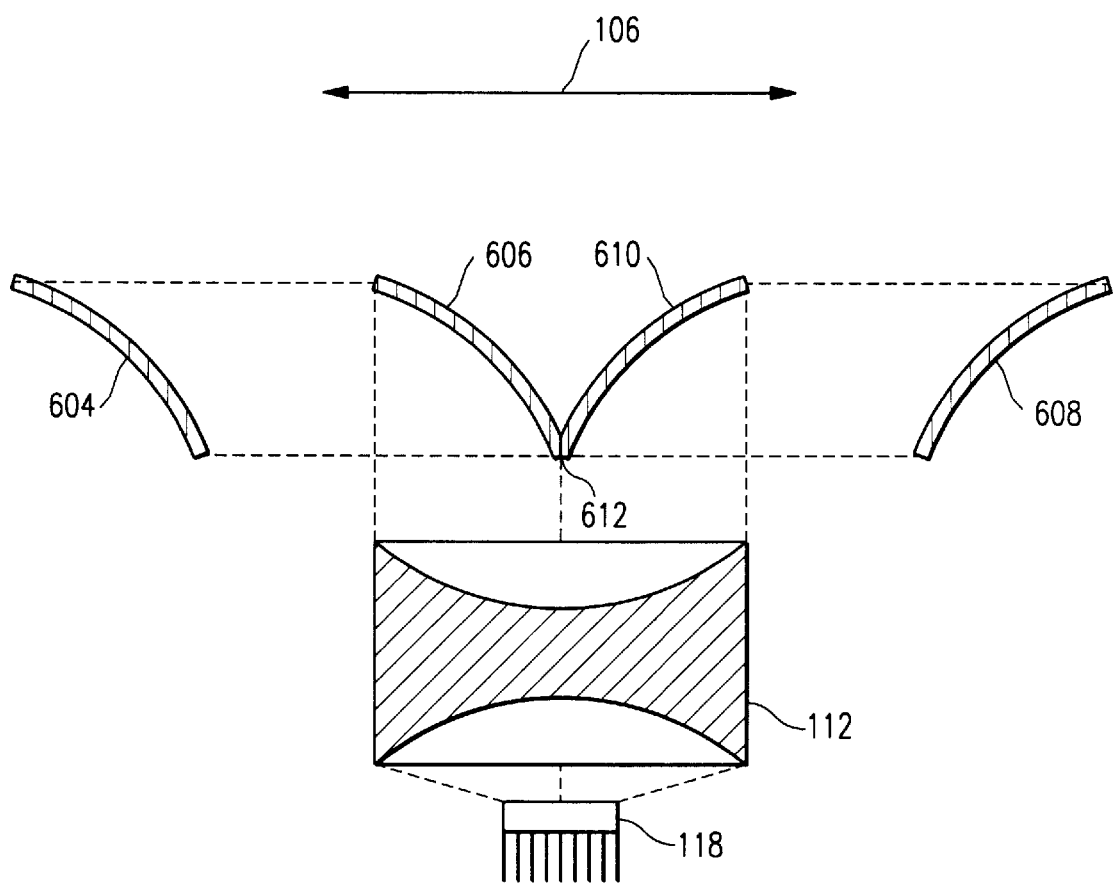
FIG. 6 is an illustrative view showing an optical system of another embodiment.
Figure 7:
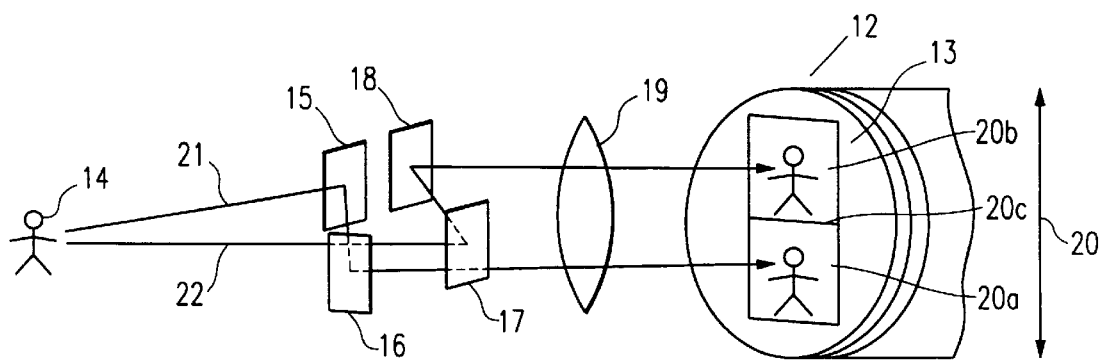
FIG. 7 is an illustrative view showing a prior art optical configuration.
Figure 8:
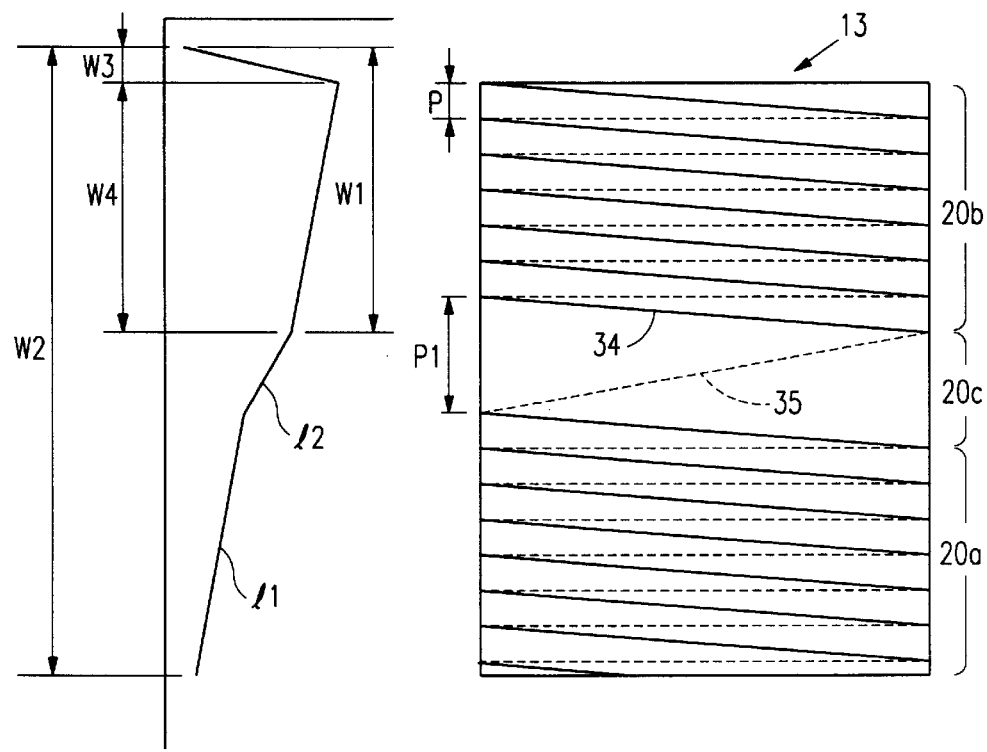
FIG. 8 is an illustrative view showing scanning status in the prior art.

FIG. 6 shows another embodiment of the optical apparatus. In the embodiment, instead of anamorphic lenses, convex mirrors and concave mirrors are used. For the left eye picture information, light from an object is first reflected by a first convex mirror 604, and then reflected by a first concave mirror 606 to the imaging lens 112. The left eye picture information is directed into the imaging lens 112 is compressed by half along the horizontal direction 106 by the function of the first convex mirror 604 and first concave mirror 606. For the a right eye picture information, light from the objects is first reflected by a second convex mirror 608 and, then reflected by a second concave mirror 610 to the imaging lens 112. The right eye picture information is directed into the imaging lens 112 is also compressed by half along the horizontal direction 106 by the function of the second convex mirror 608 and second concave mirror 610.

Each of first and second convex mirrors 604, 608 has a convex face which is directed toward the object. Each of the first and second concave mirrors 606, 610 has a concave face which directed toward the imaging lens 112. The boundary 612 between the first and second concave mirror 606 and 610 is aligned with the center of the imaging lens 112.

In this embodiment, the stereo-graphic camcorder includes a combination of the optical apparatus disclosed in FIG. 1, the conversion circuit 304 and the usual camcorder. Therefore, the usual camcorder can use the embodiment without any change. It is preferable that the conversion circuit 304 is included in the stereo-graphic monitor. In a preferred embodiment, the optical apparatus of FIG. 1 or FIG. 6 is made as an adapter, which may be attached to the front of the imaging lens of camcorder.

What is claimed is:

1. A stereo-graphic system having an optical apparatus, an imaging apparatus and a recording and reproducing apparatus, the stereo-graphic system comprising:

a first optical device in the optical apparatus for providing right eye picture information having a first direction, the right eye picture information being compressed along the first direction;

a second optical device in the optical apparatus for providing left eye picture information having a second direction which coincides with the first direction, the left eye picture information being compressed along the second direction, the first optical device and the second optical device being disposed along the first direction;

an imaging device in the imaging apparatus, the imaging device having an imaging area and providing an output imaging signal, the imaging area having a right region and a left region, the right region and the left region being disposed along the first direction;

a focusing device in the imaging apparatus, the focusing device focusing the right eye picture information and the left eye picture information on the right region and the left region of the imaging device, respectively;

a recording device in the recording and reproducing apparatus, the recording device recording the output imaging signal on a recording medium;

a reproducing device in the recording and reproducing apparatus, the reproducing device reproducing a reproducing signal from the recording medium, the reproducing signal including the right eye picture information and the left eye picture information; and a converter for receiving the reproducing signal and providing an expanded right eye picture information and an expanded left eye picture information along the first direction and the second direction, respectively, based upon the reproducing signal.

2. A stereo-graphic system defined in claim 1, wherein the right eye picture information and the left eye picture information are compressed by about half by the first and the second optical devices, respectively, and the converter expands at least one of the left eye picture information and the right eye picture information by about twofold to provide the at least one of the expanded right eye picture information and the expanded left eye picture information.

3. A stereo-graphic system defined in claim 2, wherein each of the first and the second optical devices comprises an anamorphic optical system.

4. A stereo-graphic system defined in claim 3, wherein each anamorphic optical system comprises an anamorphic lens and a plurality of plane mirrors.

5. A stereo-graphic system defined in claim 3, wherein each anamorphic optical system comprises a convex mirror and a concave mirror.

6. A stereo-graphic imaging apparatus comprising:

a first optical device for providing right eye picture information having a first direction, the right eye picture information being compressed along the first direction;

a second optical device for providing left eye picture information having a second direction which coincides the first direction, the left eye picture information being compressed along the second direction, the first optical device and the second optical device being disposed along the first direction;

an imaging device, having an imaging area and providing an output imaging signal, the imaging area having a right region and a left region being disposed along the first direction;

a focusing device focusing the right eye picture information and the left eye picture information on the right region and the left region of the imaging device, respectively; and a converter for receiving the output image signal and providing expanded right eye picture information and expanded left eye picture information along the first direction and the second direction, respectively, based upon the output imaging signal from the imaging device.

7. A stereo-graphic system defined in claim 6, wherein at least one of the right eye picture information and the left eye picture information are compressed by about half by the first and the second optical devices, respectively, and the converter expands at least one of the left eye picture information and the right eye picture information by about twofold to provide the at least one of the expanded right eye picture information and the expanded left eye picture information.

8. A stereo-graphic imaging apparatus defined in claim 7, wherein each of the first and the second optical devices comprises an anamorphic optical system.

9. A stereo-graphic imaging apparatus defined in claim 8, wherein each of the anamorphic optical systems comprises an anamorphic lens.

10. A stereo-graphic imaging apparatus defined in claim 8, wherein each of the first and the second optical device comprises a convex mirror and a concave mirror.

11. A method for recording and reproducing a stereoscopic image, the method comprising:

providing right eye picture information through a first optical device, the right eye picture information having a first direction, the right eye picture information being compressed along the first direction;

providing left eye picture information through a second optical device, the left eye picture information having a second direction which coincides with the first direction, the left eye picture information being compressed along the second direction, the first optical device and the second optical device being disposed along the first direction;

focusing the right eye picture information to project onto a right region of the imaging area of an imaging device, the imaging device having an imaging area, the imaging area having left and right regions, the right region and the left region being disposed along the first direction;

focusing the left eye picture information to project onto the left region of the imaging area of the imaging device;

providing output imaging signals from the imaging device based upon at least one of the right eye picture information to project onto the right region and the left eye picture information to project onto the left region;

recording the output imaging signals on a recording medium;

reproducing a reproducing signal from the recording medium, the reproducing signal including the right eye picture information and the left eye picture information; and providing at least one of an expanded right eye picture information and an expanded left eye picture information along the first direction and the second direction, respectively, based upon the reproducing signal.

12. A the method of claim 11, wherein the right eye picture information and the left eye picture information are compressed by about half by the first and the second optical devices and the expanded right eye picture information is expanded by about twofold over the right eye picture information of the reproducing signal and the expanded left eye picture information is expanded by about twofold over the left eye picture information of the reproducing signal.

13. The method of claim 12, the method further including providing the compressed right eye information and compressed left eye information through an anamorphic optical system.

14. The method of claim 13, the method further including providing the compressed right eye information and compressed left eye information through an anamorphic optical system having an anamorphic lens and a plurality of plane mirrors.

15. The method of claim 13, the method further including providing the compressed right eye information and compressed left eye information through an anamorphic optical system having a convex mirror and a concave mirror.

16. A method for recording and reproducing a stereoscopic image, the method comprising:

providing right eye picture information through a first optical device, the right eye picture information having a first direction, the right eye picture information being compressed along the first direction;

providing left eye picture information through a second optical device, the left eye picture information having a second direction which coincides the first direction, the left eye picture information being compressed along the second direction, the first optical device and the second optical device being disposed along the first direction;

focusing the right eye picture information to project onto a right region of the imaging area of an imaging device, the imaging device having an imaging area, the imaging area having left and right regions;

focusing the left eye picture information to project onto the left region of the imaging area of the imaging device;

providing an output imaging signal based upon at least one of the projection of the right eye picture information onto the right region and the projection of the left eye picture information onto the left region; and providing at least one of expanded right eye picture information and expanded left eye picture information along the first direction and the second direction, respectively, based upon the output imaging signal.

17. The method of claim 16, wherein the right eye picture information and the left eye picture information are compressed by half by the first and the second optical devices and the expanded right eye picture information is expanded by about twofold over the right eye picture information of the output imaging signal and the expanded left eye picture information is expanded by about twofold over the left eye picture information of the output imaging signal.

18. The method of claim 17, the method further including providing the compressed right eye information and compressed left eye information through an anamorphic optical system.

19. The method of claim 18, the method further including providing the compressed right eye information and compressed left eye information through an anamorphic optical system having an anamorphic lens and a plurality of plane mirrors.

20. The method of claim 18, the method further including providing the compressed right eye information and compressed left eye information through an anamorphic optical system having a convex mirror and a concave mirror.

* * * * *